US012574633B1

(12) United States Patent
Lee et al.

(10) Patent No.: US 12,574,633 B1
(45) Date of Patent: Mar. 10, 2026

(54) DISTRIBUTED CAMERA SYNCHRONIZATION

(71) Applicant: Amazon Technologies, Inc., Seattle, WA (US)

(72) Inventors: Wei Lee, Acton, MA (US); Conrad Miszczak, Somerville, MA (US); Joshua David Fazekas, Harleysville, PA (US); Sara Jean Woo, Andover, MA (US); Peter McGurk, Sudbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 77 days.

(21) Appl. No.: 18/757,171

(22) Filed: Jun. 27, 2024

(51) Int. Cl.
*H04N 23/66* (2023.01)
*H04N 23/80* (2023.01)

(52) U.S. Cl.
CPC ............. *H04N 23/66* (2023.01); *H04N 23/80* (2023.01)

(58) Field of Classification Search
CPC .......... H04N 23/66; H04N 23/45; H04N 7/18; H04N 23/80; G08B 13/19695; G06F 3/04817
See application file for complete search history.

(56) References Cited

U.S. PATENT DOCUMENTS

| | | | | |
|---|---|---|---|---|
| 10,194,095 | B2 * | 1/2019 | Fujiwara .............. | H04N 23/631 |
| 2013/0343019 | A1 * | 12/2013 | Amann .............. | G03G 15/0865 |
| | | | | 361/759 |
| 2020/0059628 | A1 * | 2/2020 | Cranfill ............... | G06F 3/04817 |
| 2021/0075781 | A1 * | 3/2021 | Shirvanian ........... | H04L 9/3242 |
| 2021/0097830 | A1 * | 4/2021 | England ........... | G08B 13/19695 |
| 2021/0173799 | A1 * | 6/2021 | Wang ...................... | G06F 13/20 |
| 2023/0209185 | A1 * | 6/2023 | Cuddeback .............. | H04N 7/18 |
| | | | | 348/207.11 |

* cited by examiner

*Primary Examiner* — Hung H Lam
(74) *Attorney, Agent, or Firm* — Kilpatrick Townsend & Stockton LLP

(57) ABSTRACT

Techniques for distributed camera synchronization are described herein. In an example, processing circuitry receives, from a processor, a first signal indicating a request to generate an image capture. The processing circuitry determines a first camera and a second camera. The processing circuitry determines a mapping of the first camera and the second camera to pins of the processing circuitry. A first pin of the pins is communicatively coupled with the first camera. A second pin of the pins is communicatively coupled with the second camera. The processing circuitry sends, using the first pin, a second signal to cause the first camera to generate a first image associated with the image capture. The processing circuitry sends, using the second pin, a third signal to cause the second camera to generate a second image associated with the image capture. The second image is captured synchronously with the first image.

20 Claims, 9 Drawing Sheets

802
Receive input requesting an image capture using a first camera and a second camera

804
Send a single request indicating that the first camera and the second camera are to perform the image capture

806
Receive a first image from the first camera

808
Receive a second image from the second camera

DISTRIBUTED CAMERA SYNCHRONIZATION

BACKGROUND

Many modern devices are equipped with cameras and other sensors for assisting with various actions associated with operation of the devices. For instance, vehicles may have cameras to assist drivers with operations associated with operating a vehicle. In addition, robotic devices may have cameras to assist the robotic device with operations such as navigation, picking up items, placing items, and the like.

BRIEF DESCRIPTION OF THE DRAWINGS

Various embodiments in accordance with the present disclosure will be described with reference to the drawings, in which.

DETAILED DESCRIPTION

Figure 1:
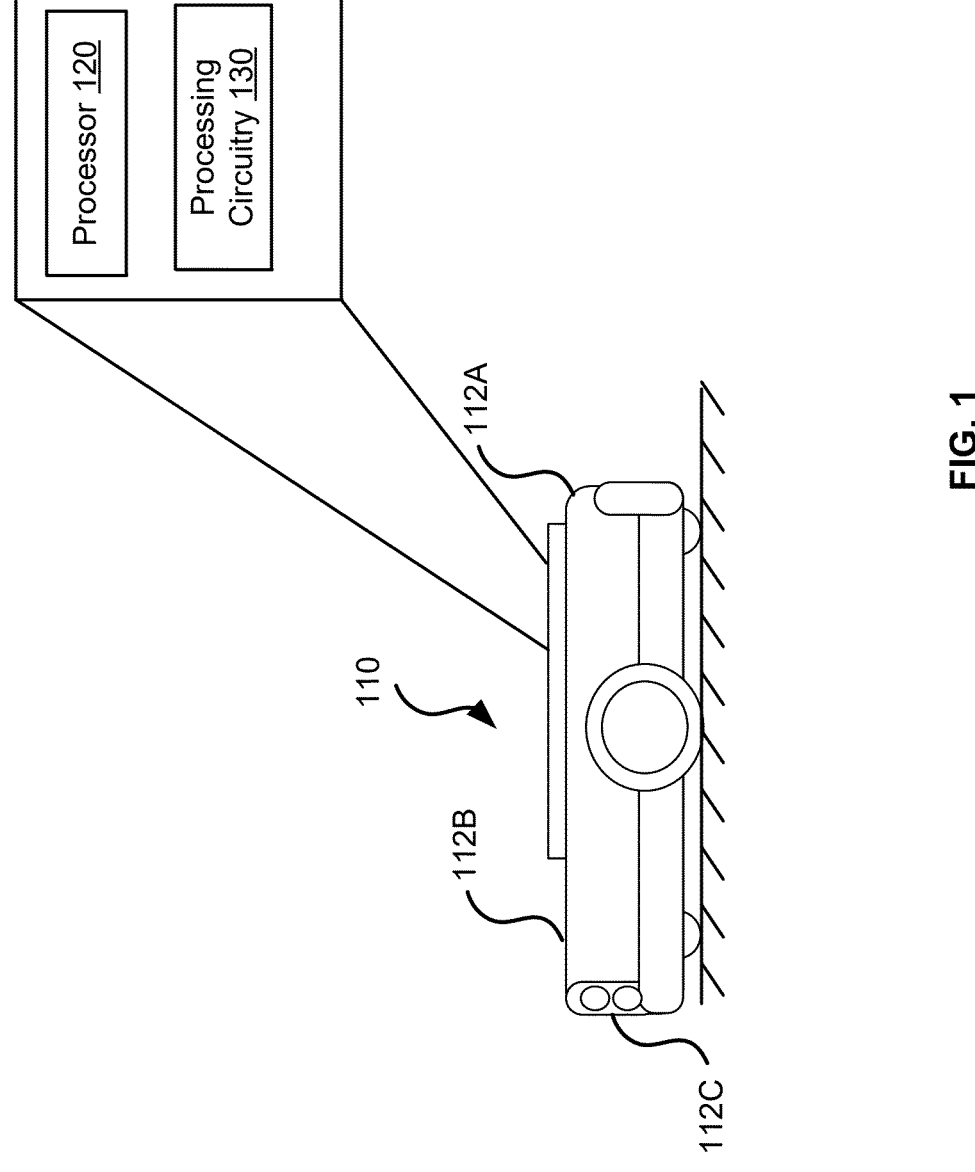
FIG. 1 illustrates an example of a side view of a mobile robot that can perform distributed camera synchronization, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein are directed to, among other things, techniques for distributed camera synchronization. In an example, a system may have multiple cameras distributed throughout the system. In order to perform accurate comparative analysis and to make determinations based on images generated from more than one of the cameras, it may be important for the cameras to synchronously capture images. To do so, processing circuitry of the system can receive a first signal indicating a request to generate an image capture using a set (e.g., at least two) of the cameras. The processing circuitry then determines which pins of the processing circuitry are communicatively coupled with the cameras in the set. The processing circuitry sends synchronous signals using the corresponding pins to each camera in the set so that the cameras generate synchronous images. In addition, the signals may be sent using a serial link to further aid with the synchronicity of the image capture over a longer distance.

To illustrate, consider an example of a robotic device in a fulfillment center environment. The robotic device can include eight cameras (indicated as Camera 1, Camera 2, Camera 3, Camera 4, Camera 5, Camera 6, Camera 7, and Camera 8) that are communicatively coupled to a compute module of the robotic device that includes a field programmable gate array and a processor. During operation of the robotic device, the processor can receive an input requesting to perform an image capture using Camera 1, Camera 2, and Camera 5. The processor can then send a request to the field programmable gate array indicating that Camera 1, Camera 2, and Camera 5 are to perform the image capture. The field programmable gate array includes general-purpose input/output (GPIO) pins that are communicatively coupled with the cameras. For instance, GPIO 1 is communicatively coupled with Camera 1, GPIO 2 is communicatively coupled with Camera 2, and GPIO 5 is communicatively coupled with Camera 5. So, the field programmable gate array can send a first signal using GPIO 1 to cause Camera 1 to generate a first image, a second signal using GPIO 2 to cause Camera 2 to generate a second image, and a third signal using GPIO 5 to cause Camera 5 to generate a third image. Each of the signals are sent synchronously and using a gigabit multimedia serial link. For instance, Cameras 1 and 2 can be preconfigured to delay generating their images by ten nanoseconds when included in a camera group with Camera 5. So, upon receiving the first signal and the second signal, the Cameras 1 and 2 can wait ten nanoseconds before beginning their image capture. As a result, the first image, the second image, and the third image can be synchronous (e.g., can depict an environment of the robotic device within four nanoseconds of each other). These images are then sent back to the processor, which can determine and control a next action by the robotic device. For instance, if the first image and the second image indicate an obstacle to the front and left of the robotic device, but the third image indicates there is no obstacle to the right of the robotic device, the processor can control movement of the robotic device to the right to avoid the obstacle.

Embodiments described herein provide several technical advantages over conventional techniques. For example, conventional systems often struggle with latency issues and the complexity of synchronizing multiple cameras, especially across different modules. For example, certain Internet Protocol (IP) cameras use a precision time protocol (PTP) to synchronize multiple cameras. The latency from request initiation to camera exposure is usually above one millisecond and varies depending Ethernet traffic pattern. The PTP approach may also require a camera module to add compute resource to process Ethernet and IP protocol, thus adding cost and complexity to the camera module. Embodiments of the present disclosure address these challenges by providing a robust, scalable and dedicated synchronization topology that minimizes latency and allows for extensive configuration and scalability across multiple camera modules. By using software to preconfigure synchronization paths, but hardware and serial links to execute image captures, the overall latency can be reduced. As a result, images may be more synchronous, leading to improved analysis and action execution. The embodiments also do not rely on Ethernet infrastructure, which can reduce complexity of the system.

For simplicity, examples describe cameras being triggered in sets of two, but any number of cameras may be included in a trigger group. For instance, in other examples, three cameras, four cameras, five cameras, or any suitable number of cameras may synchronously capture images.

FIG. 1 illustrates an example of a side view of a mobile robot 110 that can perform distributed camera synchronization, according to embodiments of the present disclosure. Generally, the mobile robot 110 may interact with items (e.g., packages, carts, etc.) to move or transport the items. The mobile robot 110 may include any suitable mechanism for lifting or grabbing an item so that the mobile robot 110 may move or transport the item. For example, the mobile robot 110 may include an arm or a grabber that grabs or lifts the item. As another example, the mobile robot 110 may include a ramp that lifts the item.

The mobile robot 110 may include sensors used in navigation or other tasks. For example, the mobile robot 110 includes cameras 112A-112C that can capture images of an environment surrounding the mobile robot 110 while the mobile robot 110 is in operation. The mobile robot 110 can include a processor 120 and processing circuitry 130 (e.g., a field programmable gate array) that control image capture operations of the mobile robot 110. For instance, the processor 120 can receive an input (e.g., from a user device or application) requesting an image capture using particular cameras (e.g., cameras 112A-112B). The processor 120 sends a single request to the processing circuitry 130 that indicates the cameras 112A-112B that are to perform the image capture. The processing circuitry 130 then sends signals, which may be referred to as synchronization pulses, to the cameras 112A-112B using corresponding pins (e.g., general purpose inputs/outputs (GPIOs)) of the processing circuitry 130. The signals are sent synchronously with each other such that the an image that is captured by the camera 112A is captured synchronously with an image captured by the camera 112B. That is, the signals may be sent within a predefined time of each other, for example within ten nanoseconds of each other. So, the single request can be used to trigger multiple cameras by splitting the request over multiple pins.

In an example, upon receiving the signals, the cameras 112A-112B each capture an image according to a capture configuration. For instance, the capture configuration for a camera may specify a delay that the camera is to wait upon receiving a signal before capturing an image, a number of images to capture in response to receiving a signal, and/or a frame rate at which to capture images. The images are then sent back to the processor 120. The processor 120 may analyze the images and then perform an action based on the images. For example, in FIG. 1 where the cameras 112A-112C are part of a robotic device (e.g., the mobile robot 110), the processor 120 may determine from the images that the mobile robot 110 is approaching an obstacle. As such, the processor 120 can control the navigation of the mobile robot 110 to avoid the obstacle.

Figure 2:
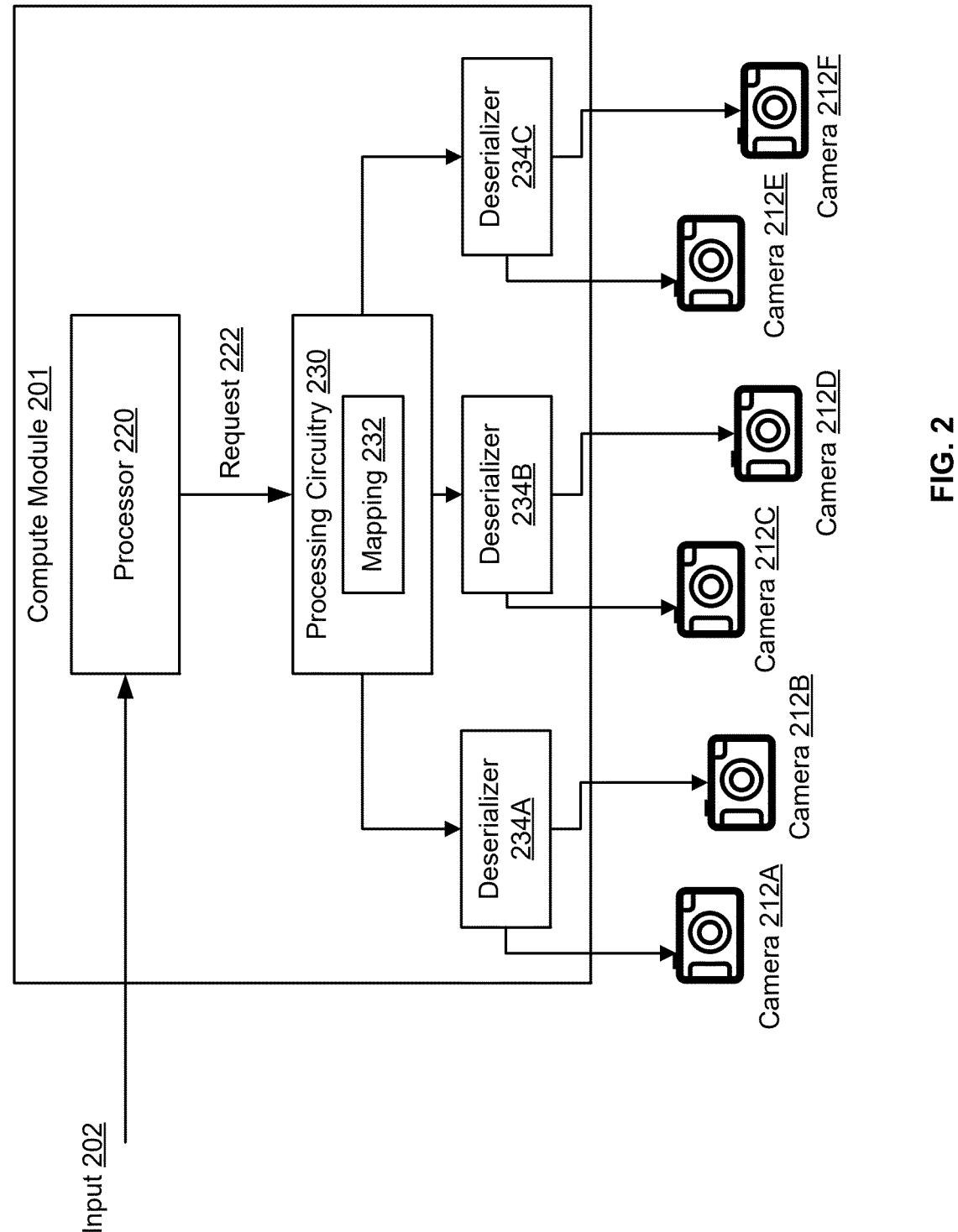
FIG. 2 illustrates an example of an architecture for distributed camera synchronization, according to embodiments of the present disclosure.

FIG. 2 illustrates an example of an architecture for distributed camera synchronization, according to embodiments of the present disclosure. The architecture includes a compute module 201 that is communicatively coupled with cameras 212A-212F. The compute module 201 includes a processor 220, which is an example of the processor 120 in FIG. 1, processing circuitry 230, which is an example of the processing circuitry 230 in FIG. 1, and deserializers 234A-234C. Each of the deserializers 234A-234C is communicatively coupled with two cameras. As illustrated, deserializer 234A is communicatively coupled with cameras 212A-

212B, deserializer 234B is communicatively coupled with cameras 212C-212D, and deserializer 234C is communicatively coupled with cameras 212E-212F. In other examples, the compute module 201 may include a different number of deserializers that are communicatively coupled with a different number of cameras.

In an example, the processor 220 receives an input 202 requesting an image capture using a set of the cameras 212A-212F. For instance, the input 202 may request an image capture using at least two of the cameras 212A-212F. The processor 220 sends a request 222 to the processing circuitry 230 indicating the cameras that are to perform the image capture. The request 222 may be a signal that is an inter-integrated circuit (I2C) command generated by the processor 220. The I2C command can instruct the processing circuitry 230 to create the signals which are used by the downstream cameras. The signals may be generated asynchronously with no set frequency. Alternatively, the request 222 may be a signal that involves a hardware-generated pulse configured to trigger sending of the signals to the downstream cameras. hardware trigger, initiated through hardware mechanisms such as internally or externally generated system sync signal. An internal hardware signal can be configured by the processor 220 (e.g., by a pulse width modulation generator) and can run continuously at a known frequency, with a known latency, to the downstream cameras. Or, an external hardware signal can be received by an input connector of the processing circuitry 230 from an external hardware entity that generates the signal and injects it into the processing circuitry 230. In some instances, the request 222 may indicate that the processing circuitry 230 is to generate signals for a single image capture using the specified cameras. Alternatively, the request 222 indicate an interval (e.g., every ten seconds) at which the processing circuitry 230 is to generate signals for the specified cameras.

The processing circuitry 230 determines a mapping 232 of the cameras 212A-212F to pins of the processing circuitry 230. For instance, each of the cameras 212A-212F may be communicatively coupled to an individual pin. For each of the cameras that are to perform the image capture, the processing circuitry 230 can send a signal to the camera using its corresponding pin. The signal is an electrical pulse that has a certain voltage level and duration depending on the sensor type. A given signal can be sent to a corresponding deserializer based on the camera to which the signal is being sent. For instance, a signal for the camera 212A can be sent to the deserializer 234A. The deserializers 234A-234C can be communicatively coupled with serializers of the cameras 212A-212F to provide serial links between the compute module 201 and the cameras 212A-212F. The serial links may be gigabit multimedia serial links (GMSLs), flat panel display (FPD)-links, or any other suitable serial link. If the processing circuitry 230 is to send signals at an interval, the processing circuitry 230 can send signals to the cameras at the interval using the pins until the processing circuitry 230 receives an additional request (or signal) indicating the processing circuitry 230 can stop.

Upon receiving a signal, a camera can generate an image associated with the image capture so that each of the cameras capture images synchronously. Once the appropriate cameras perform the image capture, the processor 220 receives the images from the cameras. The processor 220 can then process the images to determine an action to perform based on the images.

In an example, the image capture may be part of a video stream. To maintain synchronization between the cameras 212A-212F during the video stream, the compute module

201 can periodically stop and restart the video stream using the corresponding pins and according to capture configurations, as described herein below.

Figure 3:
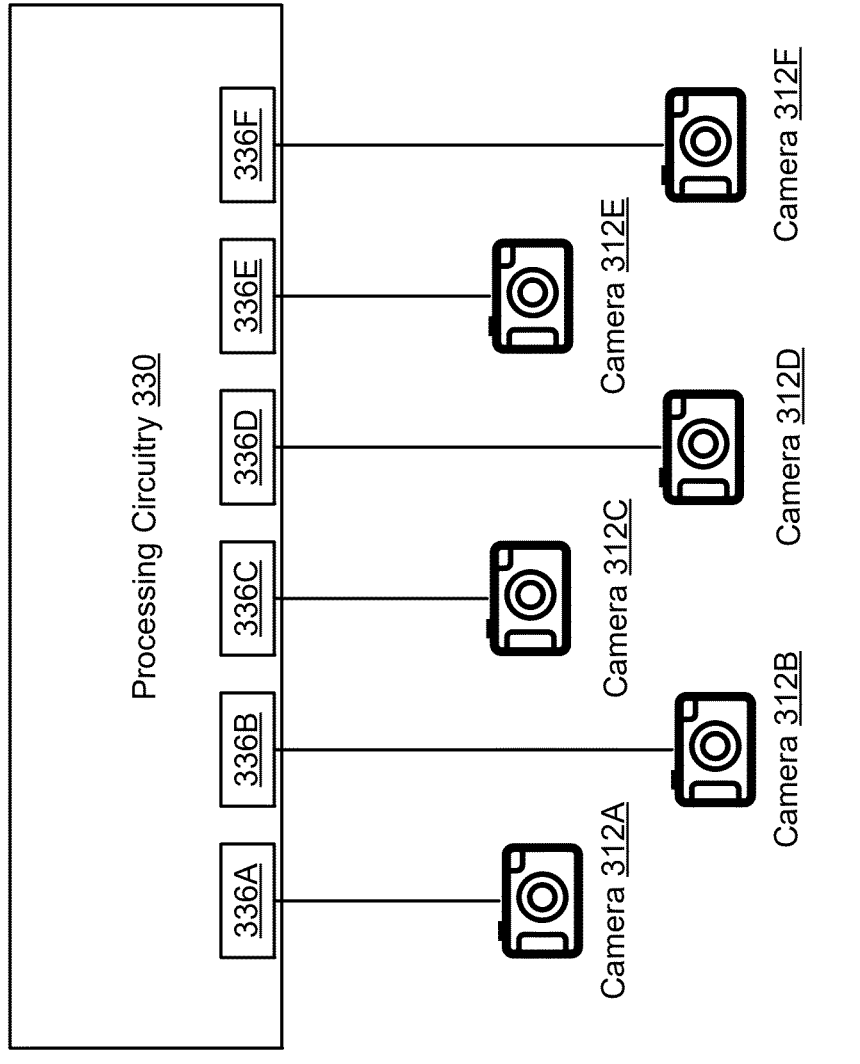
FIG. 3 illustrates an example of pin-to-camera associations, according to embodiments of the present disclosure.

FIG. 3 illustrates an example of pin-to-camera associations, according to embodiments of the present disclosure. As described herein above, processing circuitry 330, which is an example of the processing circuitry 230 in FIG. 2, can include pins 336A-336F that are communicatively coupled with cameras 312A-312F. As illustrated, pin 336A is communicatively coupled with camera 312A, pin 336B is communicatively coupled with camera 312B, pin 336C is communicatively coupled with camera 312C, pin 336D is communicatively coupled with camera 312D, pin 336E is communicatively coupled with camera 312E, and pin 336F is communicatively coupled with camera 312F.

In an example, when the processing circuitry 330 receives a signal indicating a request to generate an image capture, the processing circuitry 330 determines the cameras that are associated with the image capture. For instance, the request may indicate that camera 312B and camera 312E are associated with the image capture. The processing circuitry 330 can then determine a mapping (e.g., mapping 232 in FIG. 2) of the camera 312B to the pin 336B and of the camera 312E to the pin 336E. So, the processing circuitry 330 can send a first synchronization pulse to the camera 312B using the pin 336B synchronously with sending a second synchronization pulse to the camera 312E using the pin 336E.

Figure 4:
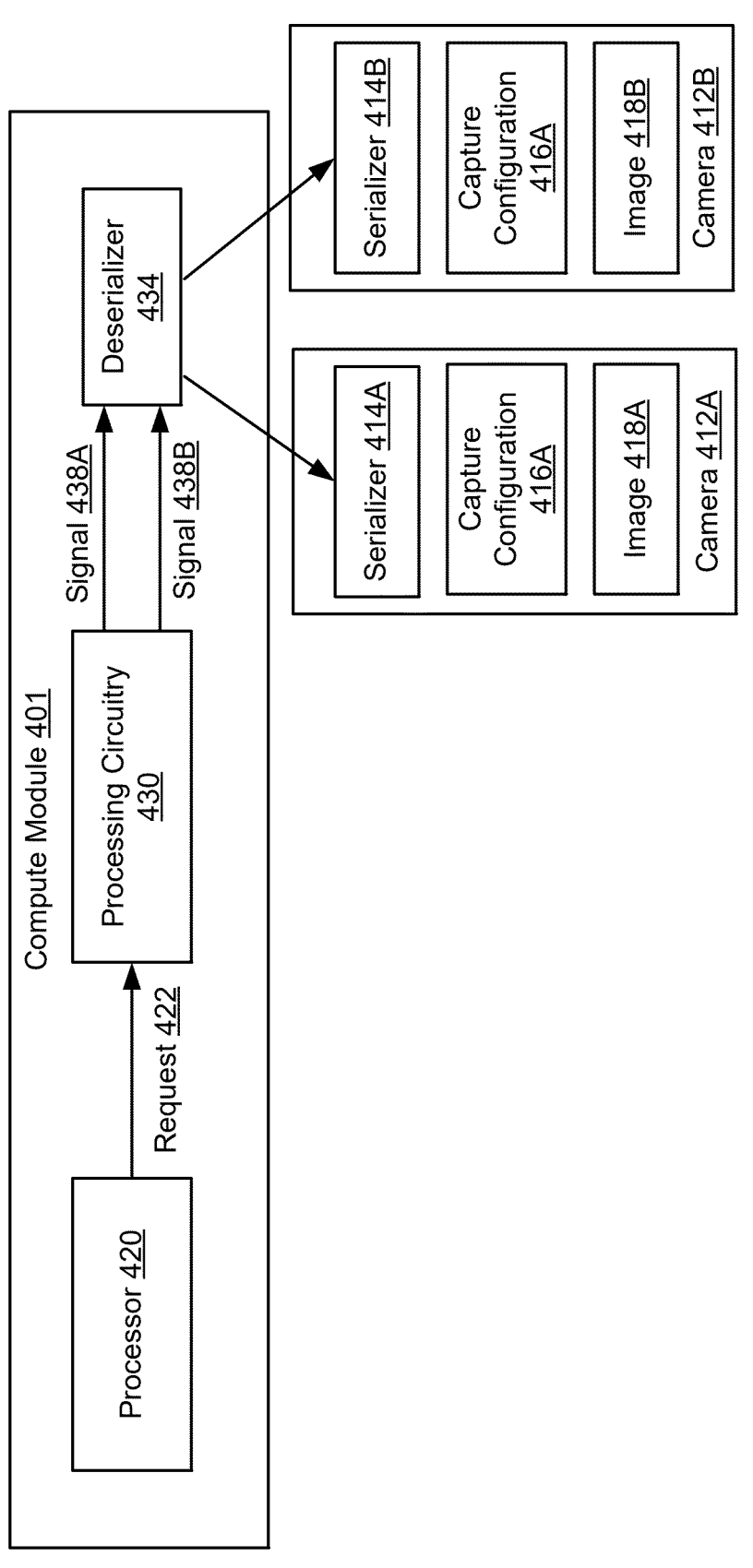
FIG. 4 illustrates an example of image capture synchronization using a single deserializer, according to embodiments of the present disclosure.

FIG. 4 illustrates an example of image capture synchronization using a single deserializer, according to embodiments of the present disclosure. A compute module 401 includes a processor 420, processing circuitry 430, and a deserializer 434. The processor 420 is an example of the processor 220 in FIG. 2, the processing circuitry 430 is an example of the processing circuitry 230 in FIG. 2, and the deserializer 434 is an example of the deserializers 234A-234C in FIG. 2.

In an example, the processor 420 receives an input requesting an image capture using cameras 412A-412B. The processor 420 sends a request 422 to the processing circuitry 430 indicating that the cameras 412A-412B are to perform the image capture. The processing circuitry 430 determines a mapping (e.g., mapping 232 of FIG. 2) of the cameras 412A-412B to pins of the processing circuitry 430. For each of the cameras 412A-412B, the processing circuitry 430 can send a signal to the camera using its corresponding pin. For instance, the processing circuitry 430 can send a signal 438A to the camera 412A using a first pin and can synchronously send a signal 438B to the camera 412B using a second pin. The cameras 412A-412B can both be associated with the deserializer 434, which can receive the signals 438A-438B and send the signals 438A-438B to serializers 414A-414B of the cameras 412A-412B, respectively. The deserializer 434 and the serializers 414A-414B provide serial links between the compute module 401 and the cameras 412A-412B. So, the signal 438A is sent to the camera 412A using a first serial link and the signal 438B is sent to the camera 412B using a second serial link. In this case, since the cameras 412A-412B are both associated with the deserializer 434, the first serial link is the same as the second serial link.

Upon receiving the signals 438A-438B, the cameras 412A-412B can generate images 418A-418B associated with the image capture so that each of the cameras 412A-412B capture the images 418A-418B synchronously. The cameras 412A-412B can capture the images 418A-418B according to capture configurations 416A-416B. The capture configurations 416A-418B can be received from the processor 420 before the request 422 is received. The capture configurations 416A-416B can indicate one or more of a predefined period of time to wait after receiving the signals 438A-438B, a number of images (e.g., a set of images) to capture in response to receiving the signals 438A-438B, or a frame rate to use to capture a set of images. For instance, the capture configuration 416A may indicate that the camera 412A is to wait five nanoseconds after receiving the signal 438A before capturing the image 418A, while the capture configuration 416B may indicate that the camera 412B is to wait zero nanoseconds after receiving the signal 438B before capturing the image 418B. This delay of five nanoseconds for the camera 412A may ensure that the cameras 412A-412B both begin exposing at the same time. The delay may account for the camera 412A being farther from the compute module 401 than the camera 412B, or for other known latencies.

In an example, once the cameras 412A-412B perform the image capture, image data associated with the image 418A is sent to serializer 414A and image data associated with the image 418B is sent to serializer 414B. The serializers 414A-414B convert the images 418A-418B into serial data that is sent to the deserializer 434. The deserializer 434 converts the serial data for each of the images 418A-418B back to the image data for the images 418A-418B. The deserializer 434 can then send the image data to the processor 420 along a single channel. The image data may be time-series multiplexed such that the serial data for the image that is received first is converted and sent as image data first along the channel. If the serial data is received at the same time, the deserializer 434 may randomly select which serial data to convert and send first. As such, the processor 420 may receive the images 418A-418B at the same time or different times.

Figure 5:
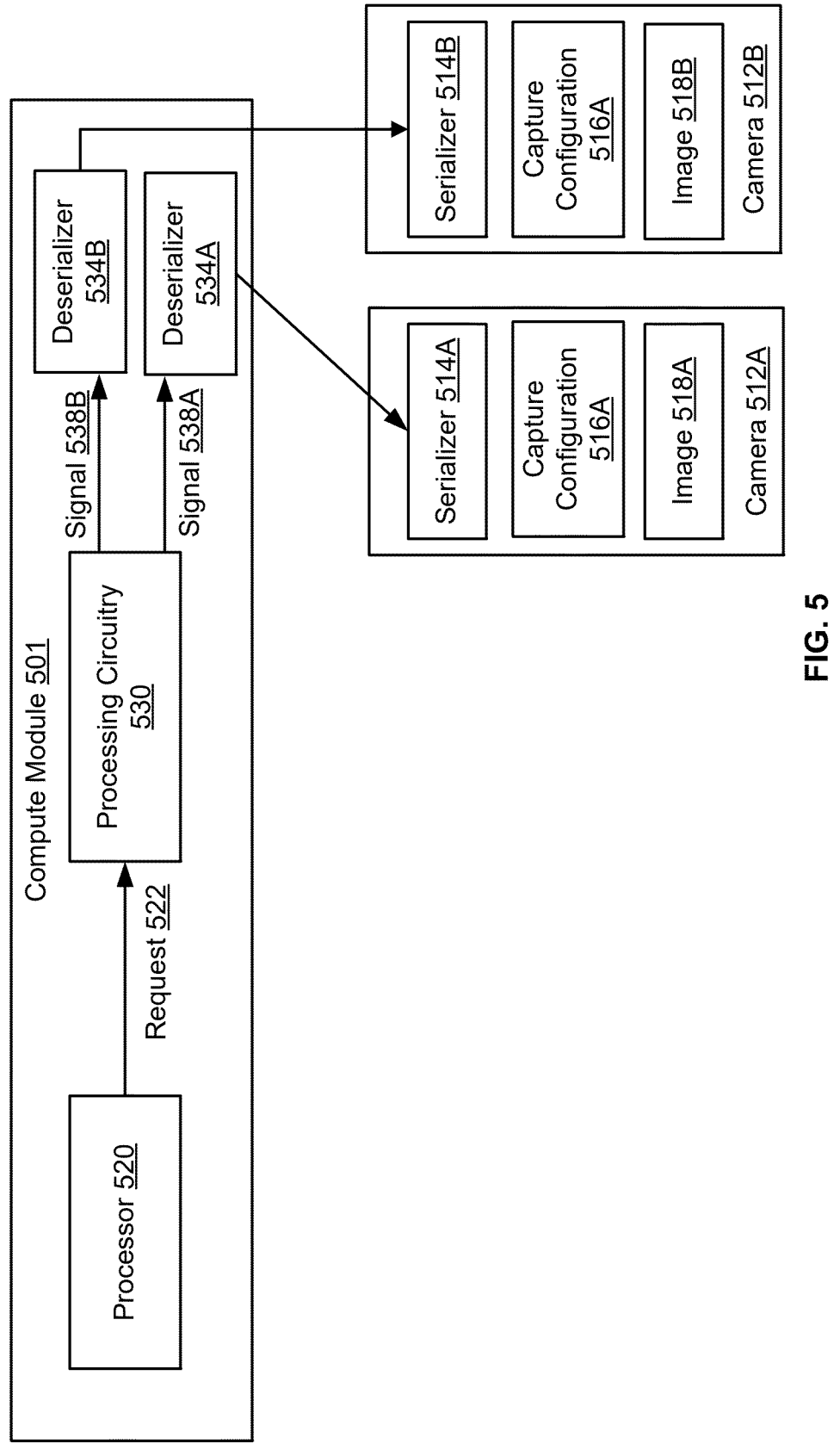
FIG. 5 illustrates an example of image capture synchronization using multiple deserializers, according to embodiments of the present disclosure.

FIG. 5 illustrates an example of image capture synchronization using multiple deserializers, according to embodiments of the present disclosure. A compute module 501 includes a processor 520, processing circuitry 530, and deserializers 534A-534B. The processor 520 is an example of the processor 220 in FIG. 2, the processing circuitry 530 is an example of the processing circuitry 230 in FIG. 2, and the deserializers 534A-534B is an example of the deserializers 234A-234C in FIG. 2.

In an example, the processor 520 receives an input requesting an image capture using cameras 512A-512B. The processor 520 sends a request 522 to the processing circuitry 530 indicating that the cameras 512A-512B are to perform the image capture. The processing circuitry 530 determines a mapping (e.g., mapping 232 of FIG. 2) of the cameras 512A-512B to pins of the processing circuitry 530. For each of the cameras 512A-512B, the processing circuitry 530 can send a signal to the camera using its corresponding pin. For instance, the processing circuitry 530 can send a signal 458A to the camera 512A using a first pin and can synchronously send a signal 538B to the camera 512B using a second pin. The camera 512A can be associated with the deserializer 534A and the camera 512B can be associated with the deserializer 534B. The deserializer 534A can receive the signal 538A and send the signal 538A to serializer 514A of the cameras 512A. Similarly, the deserializer 534B can receive the signal 538B and send the signal 538B to serializer 514B of the cameras 512B. The deserializers 534A-534B and the serializers 514A-514B provide serial links between the compute module 501 and the cameras 512A-512B. So, the signal 538A is sent to the camera 512A using a first serial link and the signal 538B is sent to the camera 512B using a second serial link. In this case, since the cameras 512A-512B are both associated with different deserializers, the first serial link is different than the second serial link.

Upon receiving the signals 538A-538B, the cameras 512A-512B can generate images 518A-518B associated with the image capture so that each of the cameras 512A-512B capture the images 518A-518B synchronously. The cameras 512A-512B can capture the images 518A-518B according to capture configurations 516A-516B. The capture configurations 516A-518B can be received from the processor 520 before the request 522 is received. The capture configurations 516A-516B can indicate one or more of a predefined period of time to wait after receiving the signals 538A-538B, a number of images (e.g., fifty images) to capture in response to receiving the signals 538A-538B, or a frame rate to use to capture a set of images. The capture configurations 516A-516B may be associated with a particular camera group that includes the cameras 512A-512B. For a different camera group (e.g., camera 512A and a different camera), the capture configuration for the camera 512A may be different. For instance, the capture configurations 516A-516B may indicate that fifty images are to be taken in response to receiving a signal, but a capture configuration for the camera 512A and a different camera may indicate that one image is to be taken in response to receiving a signal. The camera group may be indicated in the signals 538A-538B.

In an example, once the cameras 512A-512B perform the image capture, image data associated with the image 518A is sent to serializer 514A and image data associated with the image 518B is sent to serializer 514B. The serializers 514A-514B convert the images 518A-518B into serial data that is sent to the deserializers 534A-534B, respectively. The deserializers 534A-534B convert the serial data for the respective images 518A-518B back to the image data for the images 518A-518B. The deserializer 534A can then send the image data for the image 518A to the processor 520 along a channel. The deserializer 534B can send the image data for the image 518B to the processor 520 along a different channel. Even though the images 518A-518B may be synchronous, the processor 520 may receive the images 518A-518B at the same time or different times.

Although FIGS. 4-5 describe camera synchronization as involving serializers and deserializers for providing serial links, other examples may not include serializers and deserializers. Instead, the signals may be sent directly to processing circuitry of the cameras using pins of the processing circuitry of the compute modules. Serializers and deserializers may be used to increase a distance over which signals and images can be sent.

Figure 6:
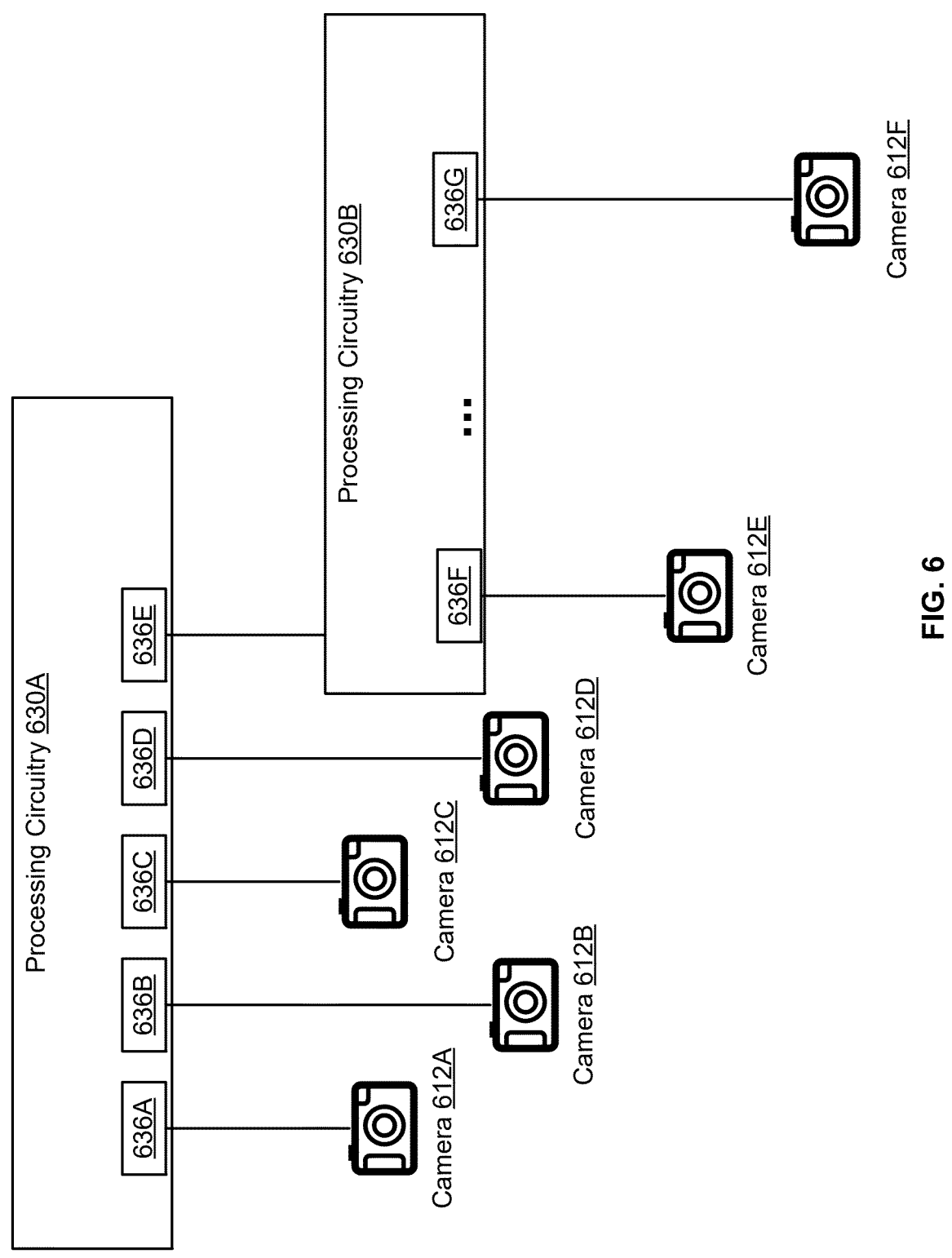
FIG. 6 illustrates an example of multiple processing circuitries being linked together, according to embodiments of the present disclosure.

FIG. 6 illustrates an example of multiple processing circuitries being linked together, according to embodiments of the present disclosure. Processing circuitries 630A-630B, which are examples of the processing circuitry 230 in FIG. 2, can each include pins that are communicatively coupled with cameras. As illustrated, processing circuitry 630A includes pins 636A-636E. Processing circuitry 630B includes pins 636F-636G. Pin 636A is communicatively coupled with camera 612A, pin 636B is communicatively coupled with camera 612B, pin 636C is communicatively coupled with camera 612C, pin 636D is communicatively coupled with camera 612D, pin 336F is communicatively coupled with camera 612E, and pin 636G is communicatively coupled with camera 612F. In addition, pin 636E is communicatively coupled with processing circuitry 630B. So, the processing circuitry 630A is linked in a chain to the processing circuitry 630B.

In an example, when the processing circuitry 630A receives a signal indicating a request to generate an image capture, the processing circuitry 630A determines the cameras that are associated with the image capture. For instance, the request may indicate that camera 612B and camera 612E are associated with the image capture. The processing circuitry 630A can then determine a mapping (e.g., mapping 232 in FIG. 2) of the camera 612B to the pin 636B and of the camera 612E to the pin 636F via the processing circuitry 630B. So, the processing circuitry 630A can send a first synchronization pulse to the camera 612B using the pin 636B synchronously with sending a second synchronization pulse to the processing circuitry 630B using the pin 636E. The processing circuitry 630B can send a third synchronization pulse to the camera 612E using the pin 636F.

Figure 7:
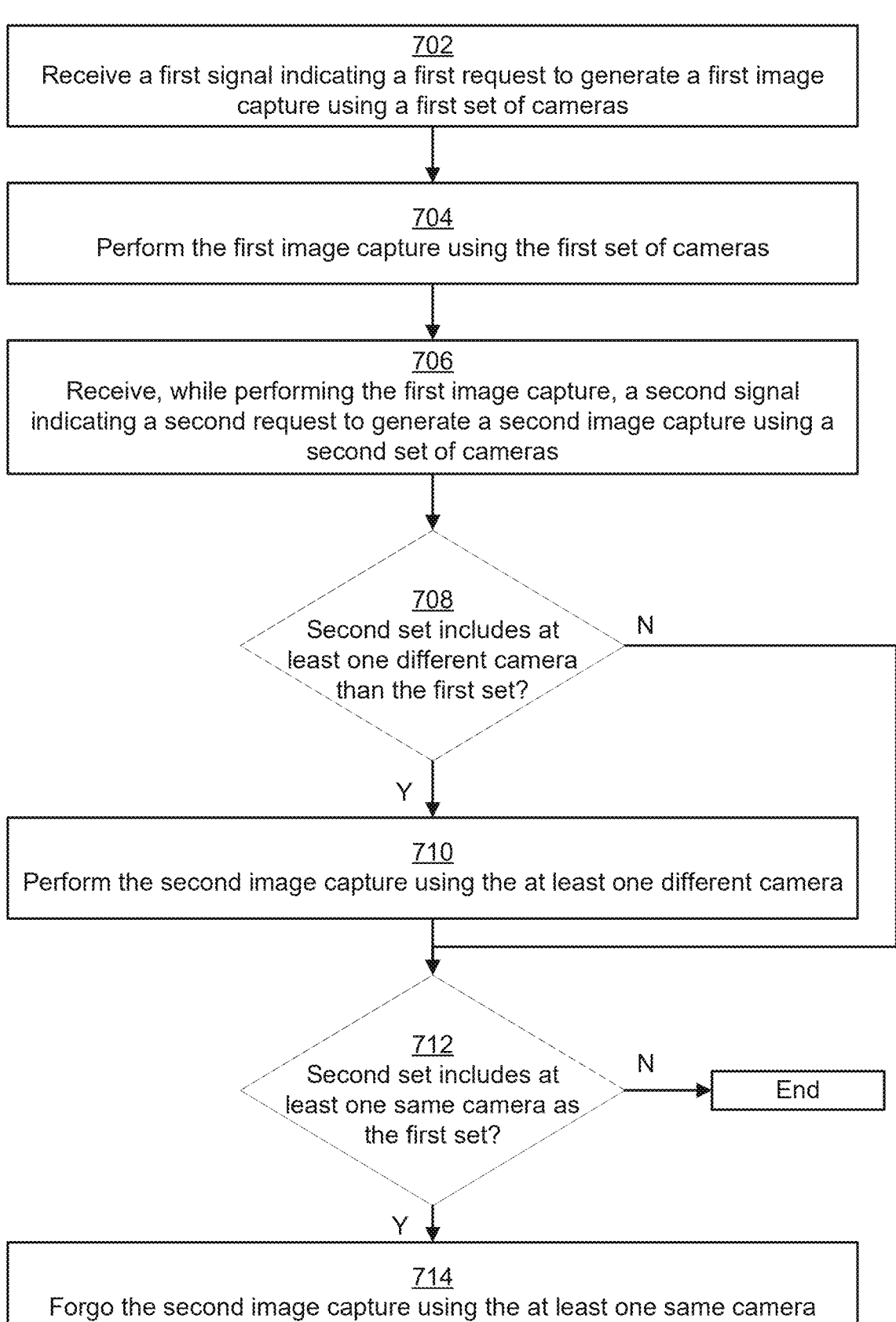
FIG. 7 illustrates an example of a flow for processing multiple image capture requests, in accordance with an embodiment of the disclosure.
Figure 8:
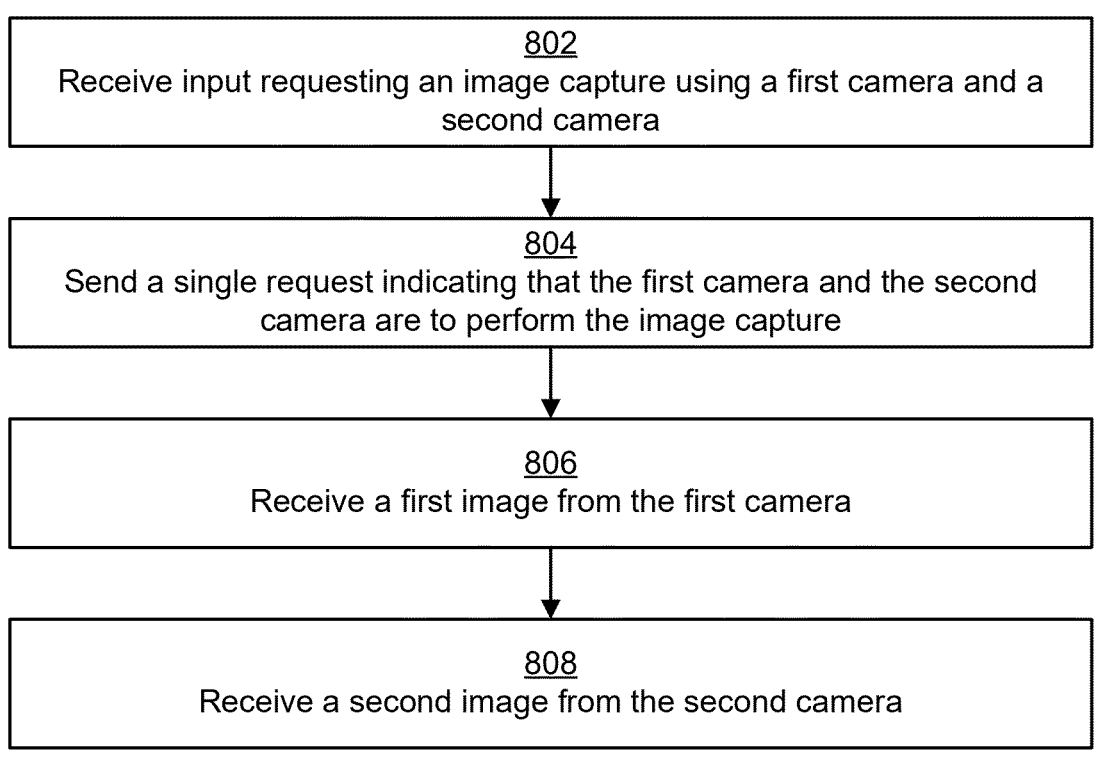
FIG. 8 illustrates an example of a flow for distributed camera synchronization, in accordance with an embodiment of the disclosure.

FIGS. 7-8 illustrate flows of processes associated with distributed camera synchronization, in accordance with various embodiments. In some embodiments, the processes may be performed by a computer system described herein (e.g., compute module 201 of FIG. 2). The processes (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Some or all of the processes (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 7 illustrates an example of a flow for processing multiple image capture requests, in accordance with an embodiment of the disclosure. In an example, the flow includes operation 702, where the computer system receives a first signal indicating a first request to generate a first image capture using a first set of cameras. The first set of cameras can include a first camera and a second camera.

In an example, the flow includes operation 704, where the computer system performs the first image capture using the first set of cameras. Performing the first image capture can involve determining a mapping of the first camera and the second camera to pins of processing circuitry. A first pin of the pins is communicatively coupled with the first camera and a second pin of the pins is communicatively coupled with the second camera. A signal is sent using the first pin to cause the first camera to generate a first image associated with the first image capture. Another signal is sent using the second pin to cause the second camera to generate a second image associated with the first image capture. The second image is captured synchronously with the first image, and the second signal and the third signal are sent synchronously.

In an example, the flow includes operation 706, where the computer system receives, while performing the first image capture, a second signal indicating a second request to generate a second image capture using a second set of cameras. For example, the second set of cameras can include the first camera and a third camera.

In an example, the flow includes operation 708, where the computer system determines whether the second set includes at least one different camera than the first set. If so, the process can proceed to operation 710. Otherwise, the process can proceed to operation 712. As an example, the computer system can determine that the second set includes the third camera that is different than the first set and proceed to operation 710.

In an example, the flow includes operation 710, where the computer system performs the second image capture using the at least one different camera. The computer system can determine the mapping of the third camera to the pins of the processing circuitry. A third pin of the pins is communicatively coupled with the third camera. The computer system sends, using the third pin, a signal to cause the third camera to generate a third image associated with the second image capture.

In an example, the flow includes operation 712, where the computer system determines whether the second set includes at least one same camera as the first set. If so, the process can proceed to operation 714. The computer system can determine that the second set includes the first camera that is the same as the first set and proceed to operation 714.

In an example, the flow includes operation 714, where the computer system forgoes the second image capture using the at least one same camera. The computer system can send a signal using the first pin to cause the first camera to generate an image associated with the second image capture. But, the first camera can forgo processing the signal since the first camera is performing the first image capture.

FIG. 8 illustrates an example of a flow for distributed camera synchronization, in accordance with an embodiment of the disclosure. In an example, the flow includes operation 802, where the computer system receives input requesting an image capture using a first camera and a second camera. The request may be received by a processor from a user device or a user application.

In an example, the flow includes operation 804, where the computer system sends a single request indicating that the first camera and the second camera are to perform the image capture. The single request can be sent from the processor to a field programmable gate array responsive to the input. Responsive to the request, the field programmable gate array can send a first signal to the first camera to capture a first image. The first signal is sent using a first pin of the field programmable gate array. The first pin is communicatively coupled with the first camera. In addition, the field programmable gate array can send a second signal to the second camera to capture a second image. The second signal is sent using a second pin of the field programmable gate array. The second pin is communicatively coupled with the second camera. The first signal is sent synchronously with the second signal.

In an example, the flow includes operation 806, where the computer system receives the first image from the first camera.

In an example, the flow includes operation 808, where the computer system receives the second image from the second camera. The first image is captured by the first camera synchronously with the second image captured by the second camera. The computer system may analyze the first image and the second image to determine an action to perform.

Figure 9:
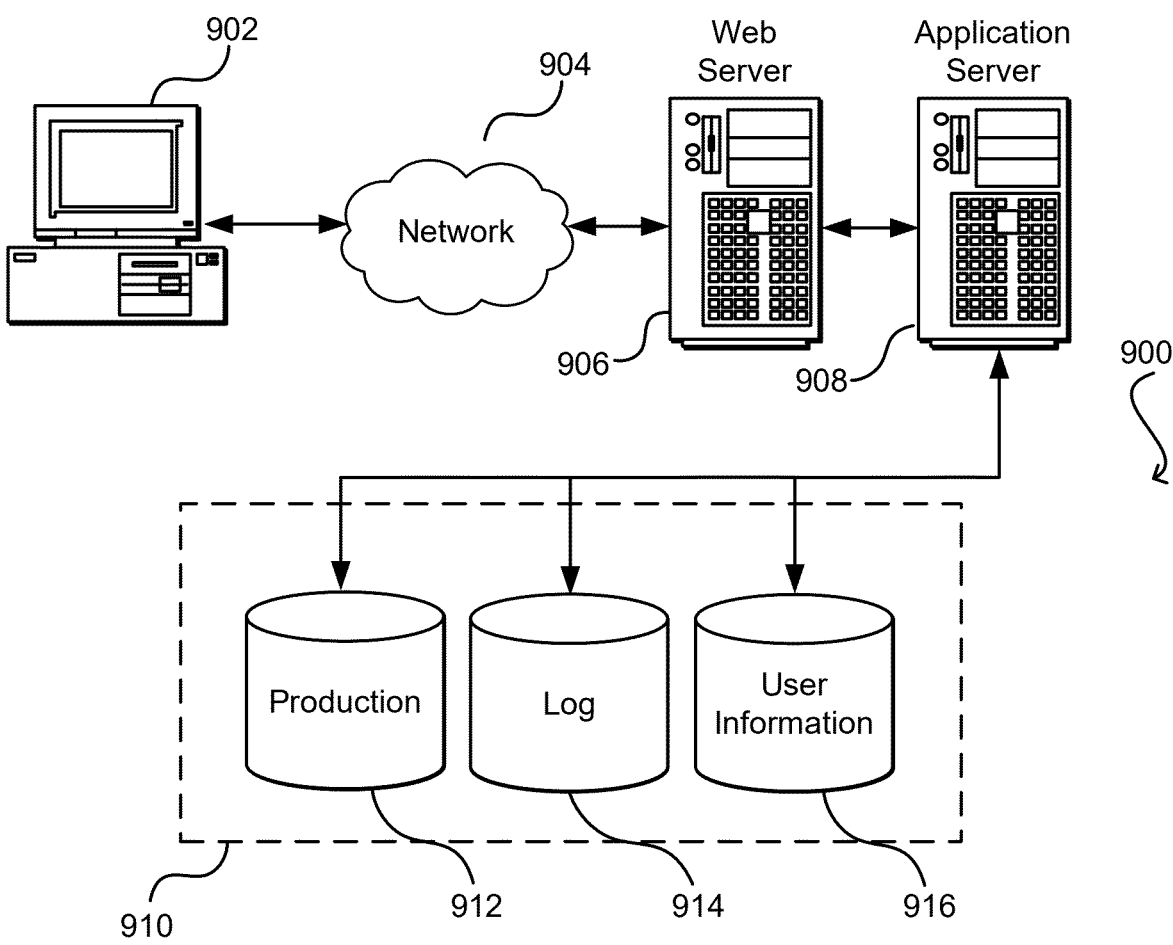
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
a first camera;
a second camera;
a field programmable gate array;
one or more processors; and
one or more memories storing computer-readable instructions that, upon execution by the one or more processors, configure the system to:
receive input requesting an image capture using the first camera and the second camera;
send, to the field programmable gate array and responsive to the input, a single request indicating that the first camera and the second camera are to perform the image capture;
receive a first image from the first camera; and
receive a second image from the second camera,
wherein:
the first image is captured by the first camera synchronously with the second image captured by the second camera,
responsive to the request, the field programmable gate array is configured to:
send a first signal to the first camera to capture the first image, the first signal sent using a first pin of the field programmable gate array, the first pin communicatively coupled with the first camera, and
send a second signal to the second camera to capture the second image, the second signal sent using a second pin of the field programmable gate array, the second pin communicatively coupled with the second camera, the second signal sent synchronously with the first signal.

2. The system of claim 1, wherein responsive to receiving the first signal the first camera is configured to:
wait a predefined period of time after receiving the first signal; and
generate the first image after the predefined period of time passes.

3. The system of claim 1, wherein the field programmable gate array is configured to:

send the first signal to a first deserializer associated with the first camera; and send the second signal to a second deserializer associated with the second camera, wherein the first deserializer is different than the second deserializer.

4. The system of claim 1, wherein the field programmable gate array is configured to:

send the first signal to a first deserializer associated with the first camera; and send the second signal to the first deserializer associated with the second camera.

5. A method implemented by processing circuitry, the method comprising:

receiving, from a processor, a first signal indicating a first request to generate a first image capture;

determining a first camera and a second camera;

determining a mapping of the first camera and the second camera to pins of the processing circuitry, a first pin of the pins communicatively coupled with the first camera, a second pin of the pins communicatively coupled with the second camera;

sending, using the first pin, a second signal to cause the first camera to generate a first image associated with the first image capture; and sending, using the second pin, a third signal to cause the second camera to generate a second image associated with the first image capture, wherein the second image is captured synchronously with the first image, and wherein the second signal and the third signal are sent synchronously.

6. The method of claim 5, wherein the first signal comprises an inter-integrated circuit (I2C) command.

7. The method of claim 5, wherein the first signal comprises a hardware-generated pulse configured to trigger sending of the second signal and the third signal.

8. The method of claim 5, wherein the first camera is configured to generate a set of images in response to receiving the second signal, wherein the set of images includes the first image.

9. The method of claim 5, further comprising:

receiving, from the processor during processing of the first signal, a fourth signal indicating a second request to generate a second image capture;

determining the first camera; and sending, using the first pin, a fifth signal to cause the first camera to generate a third image associated with the second image capture, wherein the first camera is configured to forgo processing of the fifth signal during processing of the first signal.

10. The method of claim 5, further comprising:

receiving, from the processor during processing of the first signal, a fourth signal indicating a second request to generate a second image capture;

determining a third camera;

determining the mapping of the third camera to the pins of the processing circuitry, a third pin of the pins communicatively coupled with the third camera; and sending, using the third pin, a fifth signal to cause the third camera to generate a third image associated with the second image capture.

11. The method of claim 5, further comprising:

receiving, from the processor during processing of the first signal, a fourth signal indicating a second request to generate a second image capture;

determining the first camera and a third camera;

determining the mapping of the third camera to the pins of the processing circuitry, a third pin of the pins communicatively coupled with the third camera;

sending, using the first pin, a fifth signal to cause the first camera to generate a third image associated with the second image capture, wherein the first camera is configured to forgo processing of the fifth signal during processing of the first signal; and sending, using the third pin, a sixth signal to cause the third camera to generate a fourth image associated with the second image capture.

12. The method of claim 5, further comprising:

receiving first image data associated with the first image from the first camera and second image data associated with the second image from the second camera; and sending the first image data and the second image data along a channel to the processor.

13. The method of claim 5, wherein the first signal indicates an interval at which to generate signals for the first camera and the second camera, and wherein the method further comprises:

sending, using the first pin, first signals at the interval to cause the first camera to generate first images associated with the first image capture; and sending, using the second pin, second signals at the interval to cause the second camera to generate second images associated with the first image capture.

14. An apparatus comprising:

a first camera;

a second camera; and first processing circuitry configured to:

receive, from a processor, a first signal indicating a request to generate an image capture;

determine the first camera and the second camera;

determine a mapping of the first camera and the second camera to pins of the processing circuitry, a first pin of the pins communicatively coupled with the first camera, a second pin of the pins communicatively coupled with the second camera;

send, using the first pin, a second signal to cause the first camera to generate a first image associated with the image capture; and send, using the second pin, a third signal to cause the second camera to generate a second image associated with the image capture, wherein the second image is captured synchronously with the first image, and wherein the second signal and the third signal are sent synchronously.

15. The apparatus of claim 14, wherein the first camera is configured to receive, from the processor and prior to receiving the second signal, at least one of (i) a first in indication of a predefined period of time to wait after receiving the second signal from the processing circuitry, (ii) a second indication of a number of images to capture in response to receiving the second signal, (iii) or a third indication of a frame rate to use to capture a set of images in response to receiving the second signal.

16. The apparatus of claim 14, wherein the first processing circuitry is further configured to:

send the second signal using a first serial link; and send the third signal using a second serial link.

17. The apparatus of claim 14, further comprising second processing circuitry configured communicatively coupled with the first processing circuitry, wherein the first processing circuitry is further configured to:

determine, based at least in part on the mapping, the second pin is communicatively coupled with the second camera via the second processing circuitry; and send, using the second pin, the third signal to the second processing circuitry, wherein the second processing circuitry is configured to:

send, using a third pin of the second processing circuitry communicatively coupled to the second camera, a fourth signal to the second camera to cause the second camera to generate the second image associated with the image capture.

18. The apparatus of claim 14, wherein the first processing circuitry is configured to generate the image capture during a video stream.

19. The apparatus of claim 14, wherein the apparatus comprises a robotic device, and wherein the processor is configured to control an action of the robotic device based at least in part on the first image and the second image.

20. The apparatus of claim 14, wherein the first signal comprises an inter-integrated circuit (I2C) command or a hardware-generated pulse configured to trigger sending of the second signal and the third signal.

\* \* \* \* \*